(12) United States Patent
Guichard et al.

(10) Patent No.: US 10,225,104 B2
(45) Date of Patent: Mar. 5, 2019

(54) EXTENDING NSH SERVICES INTO THE VPN L2/L3 DOMAIN

(71) Applicant: CISCO TECHNOLOGY, INC., San Jose, CA (US)

(72) Inventors: James N. Guichard, New Boston, NH (US); Carlos M. Pignataro, Raleigh, NC (US); Yixing Ruan, San Jose, CA (US); Javed Asghar, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 131 days.

(21) Appl. No.: 15/084,332

(22) Filed: Mar. 29, 2016

(65) Prior Publication Data

US 2017/0289032 A1 Oct. 5, 2017

(51) Int. Cl.
*H04L 12/46* (2006.01)
*H04L 12/725* (2013.01)

(52) U.S. Cl.
CPC ........ *H04L 12/4641* (2013.01); *H04L 45/306* (2013.01)

(58) Field of Classification Search
None
See application file for complete search history.

(56) References Cited

U.S. PATENT DOCUMENTS

| | | | |
|---|---|---|---|
| 7,664,877 B1 | 2/2010 | Sheth | |
| 8,259,564 B1 | 9/2012 | Gredler et al. | |
| 8,824,331 B1* | 9/2014 | Alaettinoglu | H04L 45/74 370/254 |
| 9,491,686 B2* | 11/2016 | Bosch | H04W 40/36 |
| 9,912,614 B2* | 3/2018 | Koganti | H04L 49/25 |
| 2007/0147363 A1 | 6/2007 | Oswal et al. | |
| 2007/0226325 A1* | 9/2007 | Bawa | H04L 12/4641 709/223 |
| 2008/0084881 A1 | 4/2008 | Dharwadkar et al. | |
| 2014/0198794 A1* | 7/2014 | Mehta | H04L 45/74 370/392 |
| 2015/0071285 A1 | 3/2015 | Kumar et al. | |
| 2015/0089082 A1 | 3/2015 | Patwardhan et al. | |
| 2015/0131484 A1 | 5/2015 | Aldrin | |
| 2016/0014016 A1 | 1/2016 | Guichard et al. | |
| 2016/0248685 A1 | 8/2016 | Pignataro et al. | |
| 2016/0277291 A1 | 9/2016 | Lakshmikanthan et al. | |
| 2016/0330111 A1 | 11/2016 | Manghirmalani et al. | |
| 2016/0344640 A1 | 11/2016 | Soderlund et al. | |

OTHER PUBLICATIONS

Kinghorn; "Network Services Headers (NSH): Creating a Service Plane for Cloud Networks" Nov. 2014 (Year: 2014).*

(Continued)

*Primary Examiner* — Alex Skripnikov
*Assistant Examiner* — Richard Schnell (57) ABSTRACT

Embodiments of the present disclosure are directed to augmenting a Network Service Header (NSH) metadata of a data packet with a virtual routing and forwarding identifier (VRF-ID) and forgoing augmenting a virtual private network (VPN) label into a multiprotocol label switched (MPLS) metadata of the data packet. A provider edge router can use the VRF-ID to identify a next hop for the data packet as a service to be applied prior to forwarding the data packet to a VPN site.

22 Claims, 4 Drawing Sheets

(56) References Cited

OTHER PUBLICATIONS

Brown, Gabriel, "Service Chaining in Carrier Networks", White Paper, Feb. 2015, 13 pgs.
J. Blendin, J. Rückert, N. Leymann, G. Schyguda and D. Hausheer, "Position Paper: Software-Defined Network Service Chaining," 2014 Third European Workshop on Software Defined Networks, Budapest, 2014, pp. 109-114.

* cited by examiner

EXTENDING NSH SERVICES INTO THE VPN L2/L3 DOMAIN

TECHNICAL FIELD

The present disclosure generally relates to extending service chain definitions to include applying services to network traffic as it is forwarded between different sites of a virtual private network (VPN).

BACKGROUND

It is not uncommon to apply a variety of services to network traffic as it is forwarded through a network service provider's network. Examples of such services include, but are not limited to, firewalls, diagnostics, prioritization routines, etc. In the context of a Layer 3 Virtual Private Network (L3VPN), such services are typically applied to traffic as it is forwarded between the VPN's different sites using Virtual Routing and Forwarding (VRF) and/or sometimes Virtual Local Area Network (VLAN) configurations. In order to keep track of the destination VPN to which the network traffic is being forwarded, the traffic is typically forced through a hub and spoke topology with VRFs/VLANs at the hub, thereby maintaining the VPN context after the services have been applied.

DESCRIPTION OF EXAMPLE EMBODIMENTS

Overview

Aspects of the embodiments of this disclosure are directed to a method for applying network services to data traffic forwarded between virtual private network (VPN) sites, the method including on a forwarding edge router in communication with an origin site associated with a VPN, receiving a data packet addressed to a target site associated with the VPN; determining a set of services to be applied to the data packet according to a service chain, wherein the determining is a function of at least one of the VPN, the origin site and the target site; augmenting a network service header (NSH) metadata of the data packet with an identifier of a virtual network context; encapsulating the data packet with Network Service Header (NSH) encapsulation, wherein a header for the encapsulated data packet indicates at least the service chain; forwarding the encapsulated data packet in accordance with the service chain.

Aspects of the embodiments of this disclosure are directed to a router that includes a hardware processor, the router configured to: receive a data packet addressed to a target site associated with a VPN; determine a set of services to be applied to the data packet according to a service chain, wherein the determining is as a function of at least one of the VPN, an origin site and the target site; augment a Network Service Header (NSH) metadata of the data packet with an identifier of a virtual network context associated with the VPN; encapsulate the data packet with (NSH) encapsulation, wherein a header for the encapsulated data packet indicates at least the service chain; forward the encapsulated data packet in accordance with the service chain.

Aspects of the embodiments are directed to a method for applying network services to data traffic forwarded between virtual private network (VPN) sites, the method including on a forwarding edge router in communication with an origin site associated with a VPN, receiving an data packet addressed to a target site associated with the VPN; determining a service to be applied to the data packet according to a service chain based at least in part on an identifier of a virtual network context in a Network Service Header (NSH) metadata of the data packet, wherein the determining is a function of at least one of the VPN, the origin site and the target site; and routing the data packet to a service function forwarder associated at the determined service.

Aspects of the embodiments are directed to a router that includes a hardware processor, the router configured to: receive an data packet addressed to a target site associated with the VPN; determine a service to be applied to the data packet according to a service chain based at least in part on an identifier of a virtual network context in a Network Service Header (NSH) metadata of the data packet, wherein the determining is a function of at least one of the VPN, the origin site and the target site; and route the data packet to a service function forwarder associated at the determined service.

Some implementations of the embodiments include forgoing augmentation of the a VPN label into multiprotocol label switched (MPLS) metadata of the data packet.

In some implementations of the embodiments, the identifier of the virtual network context includes a virtual routing and forwarding identifier (VRF-ID) of a VRF associated with the VPN, wherein the VRF-ID identifies a VRF-name and a VRF table indicating one or more services to be applied to the data packet.

In some implementations of the embodiments, the VPN sites are Level 3 VPN (L3VPN) sites.

In some implementations of the embodiments, determining a set of services includes looking up the set of services to be applied in a Virtual Routing and Forwarding (VRF) table according to at least one of the VPN, the origin site or the target site.

In some implementations of the embodiments, the service chain is used to apply the set of services to the data traffic addressed to more than one the target site.

In some implementations of the embodiments, the router is a provider edge router.

In some implementations of the embodiments, the identifier of the virtual network context includes a virtual routing and forwarding identifier (VRF-ID) of a VRF associated with the VPN.

In some implementations of the embodiments, the VPN is a Level 3 VPN.

In some implementations of the embodiments, the router is configured to attach an MPLS label to the data packet, and the router is further configured to forgo augmentation of a VPN label into MPLS metadata of the data packet.

In some implementations of the embodiments, the router is a receiving edge router in communication with the target site.

In some implementations of the embodiments, the router is a virtual penultimate edge router, wherein the virtual penultimate edge router is positioned between the origin site and the target site.

Some implementations of the embodiments include inserting a next hop indication into the NSH metadata at the virtual penultimate edge router, wherein the next hop indication refers to a receiving edge router in communication with the target site.

Some implementations of the embodiments include routing the data packet from the service function forwarder to at least one VPN site based on a destination address.

In some implementations of the embodiments, the identifier of the virtual network context includes a virtual routing and forwarding identifier (VRF-ID) of a VRF associated with the VPN.

In some implementations of the embodiments, the router is configured to define a virtual penultimate edge router as an end for the service chain, wherein the virtual penultimate edge router is positioned between the origin site and the target site.

In some implementations of the embodiments, the router is a virtual penultimate edge router, wherein the virtual penultimate edge router is logically positioned between the origin site and the target site, and wherein the router is configured to insert a next hop indication into the NSH metadata at the virtual penultimate edge router, wherein the next hop indication refers to a receiving edge router in communication with the target site.

In some implementations of the embodiments, the router is configured to route the data packet from the service function forwarder to at least one VPN site based on a destination address.

In some implementations of the embodiments, the identifier of the virtual network context includes a virtual routing and forwarding identifier (VRF-ID) of a VRF associated with the VPN.

DETAILED DESCRIPTION

In some cases, the enterprise may want to apply services within its own network domain. This disclosure pertains to extending the operator based service chaining into an Enterprise site.

This disclosure provides the extensions to allow traffic exiting an operator NSH-based service chain to be identified and forwarded into the right L2/L3 VPN context so that Enterprise specific services may be applied within the receiving site.

An advantage of L3VPN may be the any-to-any nature of connectivity between devices participating in different sites. Unfortunately, the indirect routing of a hub and spoke topology may effectively negate such an advantage. It will therefore be appreciated by one of ordinary skill in the art that maintaining a VPN context while providing services by forcing a hub and spoke topology with VRFs/VLANs at the hub may be problematic. Furthermore, a given network may configured to provide both forwarding and services for thousands of VPNs; VLAN stitching may be required on a per VPN basis, thereby rendering such a solution both complex and cost/ineffective.

It will be appreciated that the complexity of such a configuration may be, at least in part, a function of the typically conflicting needs of the forwarding plane (i.e., the architecture for forwarding traffic from one point to another) and the services plane (i.e., the architecture for providing services to such traffic as it is forwarded). However, the use of Network Service Header (NSH) service chains may provide a more dynamic service insertion architecture without the complexity of a hub and spoke topology, thereby facilitating the decoupling of forwarding from services.

Figure 1:
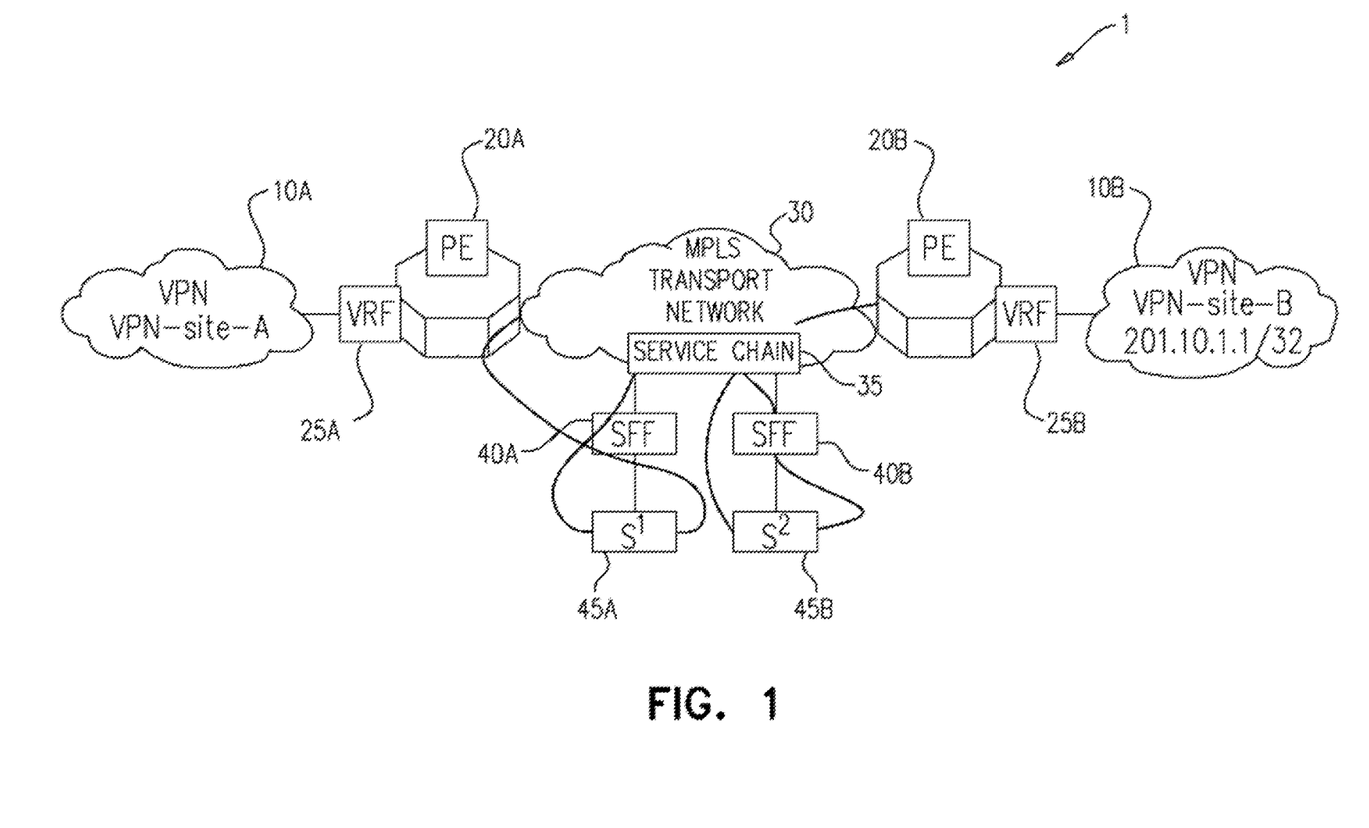
FIG. 1 illustrates an exemplary L3VPN with an NSH service plane, constructed and operative in accordance with embodiments described herein.

Reference is now made to FIG. 1 which illustrates an exemplary L3VPN 1, constructed and operative in accordance with embodiments described herein. L3VPN 1 includes VPN sites 10A and 10B, provider edge routers (PE) 20A and 20B, VRFs 25A and 25B, and multiprotocol label switched (MPLS) network 30. VPN sites 10A and 10B are two non-directly connected sites, which have at least one device each that belongs to a common VPN. PE 20A and 20B are operated by a network service provider and are configured to provide connectivity between at least VPN sites 10A and 10B via MPLS network 30 which is also operated by the network service provider. It will be appreciated by one of ordinary skill in the art that in the interest of clarity a minimum number of VPN sites 10 and provider edge router 20 are depicted in FIG. 1. It will similarly be appreciated that VPN sites 10 may be associated with multiple VPNs, and that MPLS network 30 may be configured to support communication between multiple VPNs.

In accordance with an exemplary embodiment, traffic, i.e., data packets, originating from VPN site 10A may be forwarded within the same VPN via MPLS network 30 to VPN site 10B. MPLS network 30 may employ an MPLS label stack to preserve the VPN context while the traffic is forwarded to VPN site 10B. For example, L3VPN 1 may support a forwarding topology of:

VPN site 10A—(VRF 25A)PE 20A . . . MPLS 30 . . . PE 20B(VRF 25B)—VPN site 10B—201.10.1.1/32 (VPN-label 201)

PE 20A may use VRF 25A to lookup routing for the address 201.10.1.1/32. Based on the result of the lookup, PE 20A may push an MPLS label stack {VPN-label-201, PE 20B-transport-label} onto traffic (i.e., one or more data packets) to be forwarded to address 201.10.1.1/32 that is reachable through VPN site 10B. The transport label (i.e., PE 20B) is used to forward the traffic from PE 20A to PE 20B, and the VPN-label (i.e., "201") provides PE 20B the "context" in which to forward the traffic, in this case to 201.10.1.1/32. It should be noted that PE 20A may use a per-prefix label for the target VPN (i.e., "201"), or alternatively a per-VRF label (i.e., VRF 25B) thereby forcing a lookup of the destination within the labeled VRF. In such a case, PE 20B may then lookup the routing for 201.10.1.1/32 in VRF 25B.

In accordance with embodiments described herein, an NSH service chain (i.e., set of services) may be inserted between PE 20A and PE 20B so that traffic between VPN site 10A and VPN site 10B flows through the set of services $S^1$ and $S^2$ within the chain, though there may be more than two within a chain. As shown in FIG. 1, service 45A ($S^1$) may be coupled to service chain 35 via service function forward (SFF) 40A and service 45B ($S^2$) may be coupled to service chain 35 via SFF 40B. Accordingly, per the example of FIG. 1, service chain 35 may be defined as {Service 45A, Service 45B, PE 20B}, where PE 20B is the termination point of the service chain. With the addition of NSH service chain 35, the previously described forwarding topology may be represented as:

VPN site 10A—(VRF 25A)PE 20A . . . S1 45A . . . S2 45B . . . PE 20B(VRF 25B)—VPN site 10B—201.10.1.1/32 (VPN-label 201)

To implement this forwarding topology, PE 20A may classify the traffic to essentially bypass the normal forwarding process (i.e., bypass the L3VPN routing decision) by encapsulating the traffic as NSH packets rather than adding an MPLS label stack as previously described. The NSH header may then be used to steer the traffic through service chain 35 {i.e., Service 45A, Service 45B, PE 20B}. However, it will be appreciated by one of ordinary skill in the art, that without the VPN-label-201 MPLS label as described hereinabove, by the time the traffic reaches the end of service chain 35, i.e., PE 20B, however, the forwarding context may be lost and PE 20B may have no indication what context (i.e., VPN/VRF) to use other than the destination of the packet 102.10.1.1/32.

In accordance with embodiments described herein, the forwarding context may be maintained after directing L3VPN traffic through service chain 35 between PE 20A and 20B by configuring NSH to indicate that an MPLS label stack follows the NSH encapsulation, where the label stack contains the VPN-label allocated for the destination of the traffic by PE 20B so that it can continue to forward the traffic within the correct forwarding context.

Within a L3VPN it may be necessary to apply one or more services to packet flows sent between sites of the VPN. These services may be applied by redirecting the traffic through an NSH service chain within the L3VPN operator's infrastructure.

Figure 2:
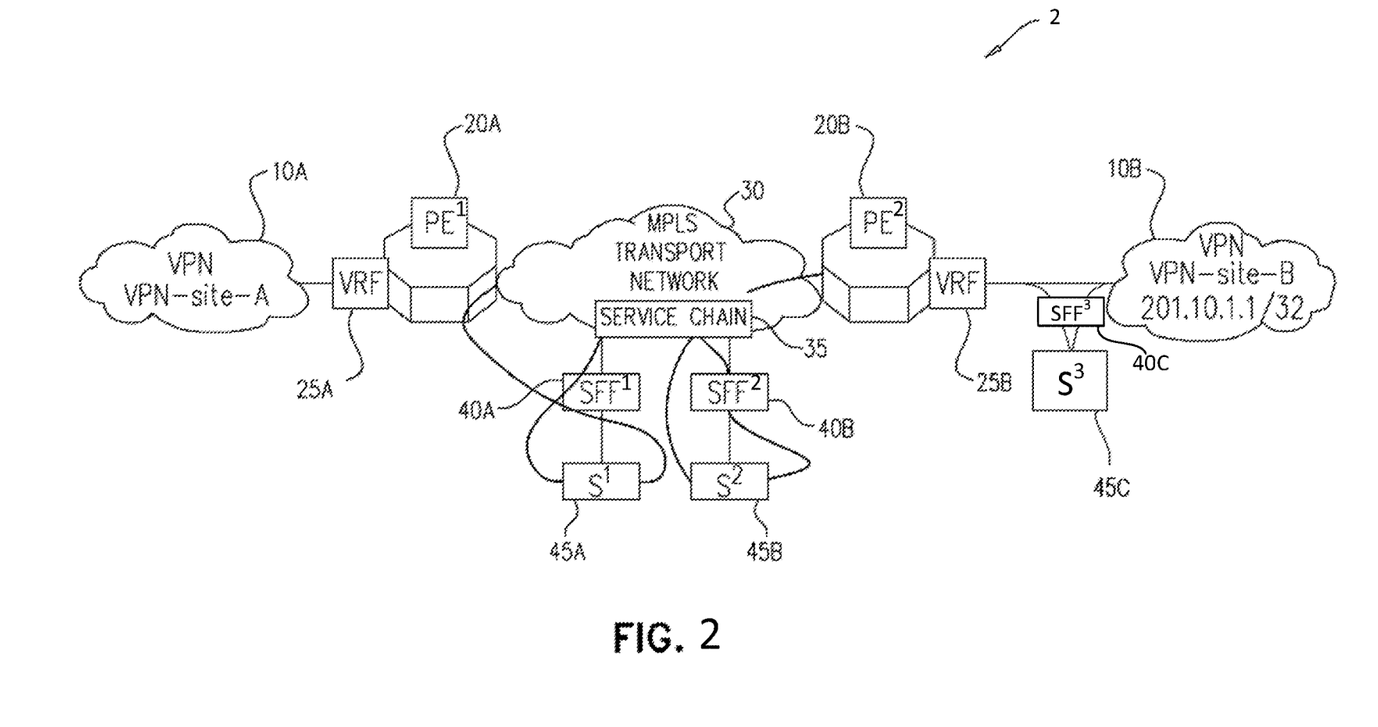
FIG. 2 illustrates an exemplary L3VPN with an NSH service plane, constructed and operative in accordance with embodiments described herein

While service chaining within the operator infrastructure is useful there are many cases where the service chain needs to be extended from the operator infrastructure into an attached VPN site. In some instances, this is not possible as the service chain terminates at the edge of the operators network and traffic is forwarded into an attached VPN site without the necessary NSH encapsulation to continue the service chain. Referring to FIG. 2 as an example, FIG. 2 is a schematic block diagram of an exemplary L3VPN 2 with an NSH service plane, constructed and operative in accordance with embodiments described herein.

In FIG. 2, an NSH service chain (i.e., set of services) is applied between PE1 20A and PE2 20B so that traffic between vpn-site-A 10A and vpn-site-B 10B of L3VPN 2 (hereinafter referred to as VPN-Alpha 2) flows through the set of services within the chain. With a service chain defined as {S1, S2}, the topology can be written as:

VPN-SITE-A 10A—(VRF-ALPHA 25A)PE1 20A . . . S1 45A . . . S2 45B . . . PE2 20B(VRF-ALPHA 25B)—VPN-SITE-B 10B—201.10.1.1/32 (VPN-LABEL 201), which is similar to that shown above for FIG. 1.

The NSH header is used for traffic steering through the service chain {S1, S2}. In this example embodiment, the vpn-label 201 is carried within the NSH metadata and extracted by PE2 20B once the service chain 35 has been applied. If for example an NSH path-id of [100] and service index (SI) of [255] is assigned for service chain {S1, S2} then each of the SFFs 40A and 40B along the path are programmed so that a lookup on [100, SI] results in traffic being forwarded to the correct service, S1 or S2, and then finally the service chain is terminated.

In FIG. 2, however, an additional service, S3, is applied. Service S3 resides within vpn-site-B 10B of VPN-Alpha 2. A new service chain definition {S1, S2, S3} can be created and a new NSH path-id of [101] and service index [255] is generated. However, this service chain topology cannot work successfully because when the SFF 40B performs a lookup on NSH [101, SI] post-S2 processing, the lookup will fail as the IP reachability of S3 is not available within the operator infrastructure as it is a route associated with the VPN context.

To overcome this limitation and allow for extension of an NSH service chain into an attached VPN site, the following extensions can be used:

1. A service chain that includes the egress PE exit point of a given destination can be created (e.g., the service chain includes PE2 20B in FIG. 2);

2. The egress PE exit point becomes an SFF logical forwarding point. In other words, egress PE can forward the packet based upon the NSH path-id+service index but the forwarding is SFF→SFF rather than SFF→SF. For example, the PE2 20B can extract NSH path-id+service index for the packet from the packet NSH metadata. The packet forwarding information includes SFF3 40C and service S3 45C.

3. The egress PE exit point is programmed on a per NSH service function path (SFP) basis to either a) associate the SFP with a given VPN, or b) extract the VRF-ID from the NSH metadata so that a forwarding context can be discovered; and 4. The egress PE exit point uses the forwarding context of the SFP to determine which VPN context to do a lookup in for the next SFF in the service chain.

The resulting topology is:

VPN-SITE-A 10A—(VRF-ALPHA 25A)PE1 (20A) . . . S1 45A . . . S2 45B . . . PE2 20B(VRF-ALPHA 25B)—VPN-SITE-B 10B . . . S3 45C . . . 201.10.1.1/32, which includes PE2 20B and S3 45C, where VRF-ALPHA is associated with VPN-Alpha 2.

Using the extensions described above, the forwarding operation for service chain {S1, S2, PE2, S3} can be created.

Figure 3:
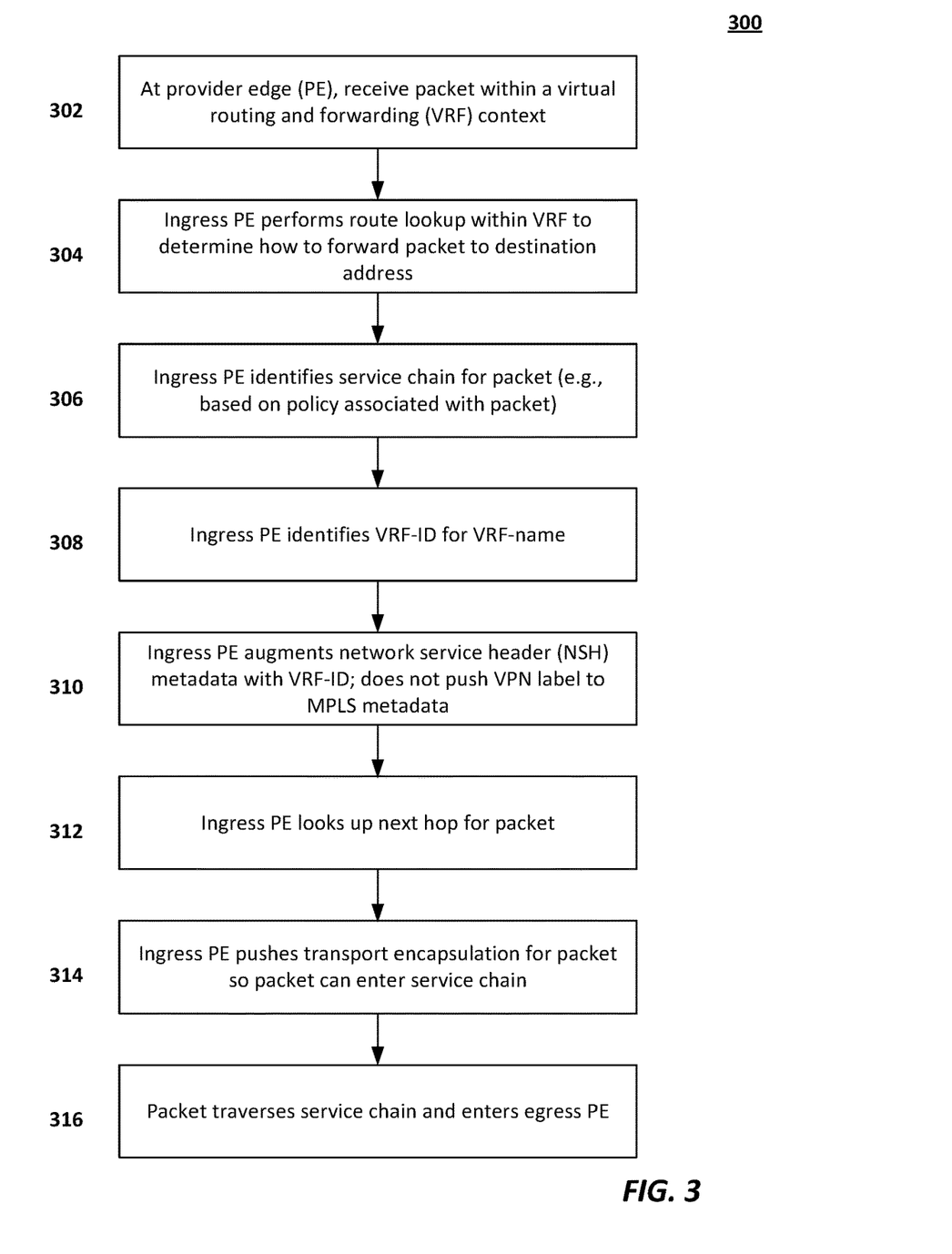
FIG. 3 is a process flow diagram for augmenting a packet with forwarding information for a service chain in accordance with embodiments of the present disclosure.

FIG. 3 is a process flow diagram 300 for transmitting a packet within VPN-Alpha 2 in accordance with embodiments of the present disclosure. A packet destined to 201.10.1.1/32 from vpn-site-A arrives at PE1 within the vrf-alpha context (302). PE1 does a route lookup within vrf-alpha to determine how to forward traffic to the destination address, 201.10.1.1/32 (304). The result of this lookup returns 1) the egress PE through which the destination is reachable, and 2) the VPN label allocated by that egress PE for the destination. In the example of VPN-Alpha 2 (of FIG. 2), the result of {egress PE, vpn-label} is {PE2, vpn-label-201}.

PE1 determines through policy that traffic destined to 201.10.1.1/32 and reachable via PE2 must be sent through a set of services that are reachable through a service chain called "vrf-alpha-chain-PE2" (306) whose elements are {S1, S2, PE2, S3} and that uses a rendered service path (RSP) with <service-path-id 101, index 255>. Because the egress PE, PE2, is not the termination point of the service chain, PE1 pushes the VRF-ID associated with vrf-alpha into the network service header (NSH) metadata of the packet and does not push the VPN label into the MPLS metadata (310). The VRF-ID associated with vrf-alpha will indicate the next hop for the packet when it reaches the egress PE, PE2 20B (of FIG. 2), the next hop being the service S3 45C. By forgoing adding the VPN label into the MPLS metadata, the egress PE will forgo forwarding the packet into the enterprise site. Instead, the PE2 20B will forward the packet according to the VRF-ID identified in the NSH metadata.

PE1 performs a lookup on <NSH path-id 101, SI 255> to determine the next-hop so that traffic is forwarded to S1 (the first service in the chain) (312).

PE1 then pushes the necessary transport encapsulation to force traffic into the service chain (314). Traffic is then forwarded through the service chain using the NSH header (316).

Figure 4:
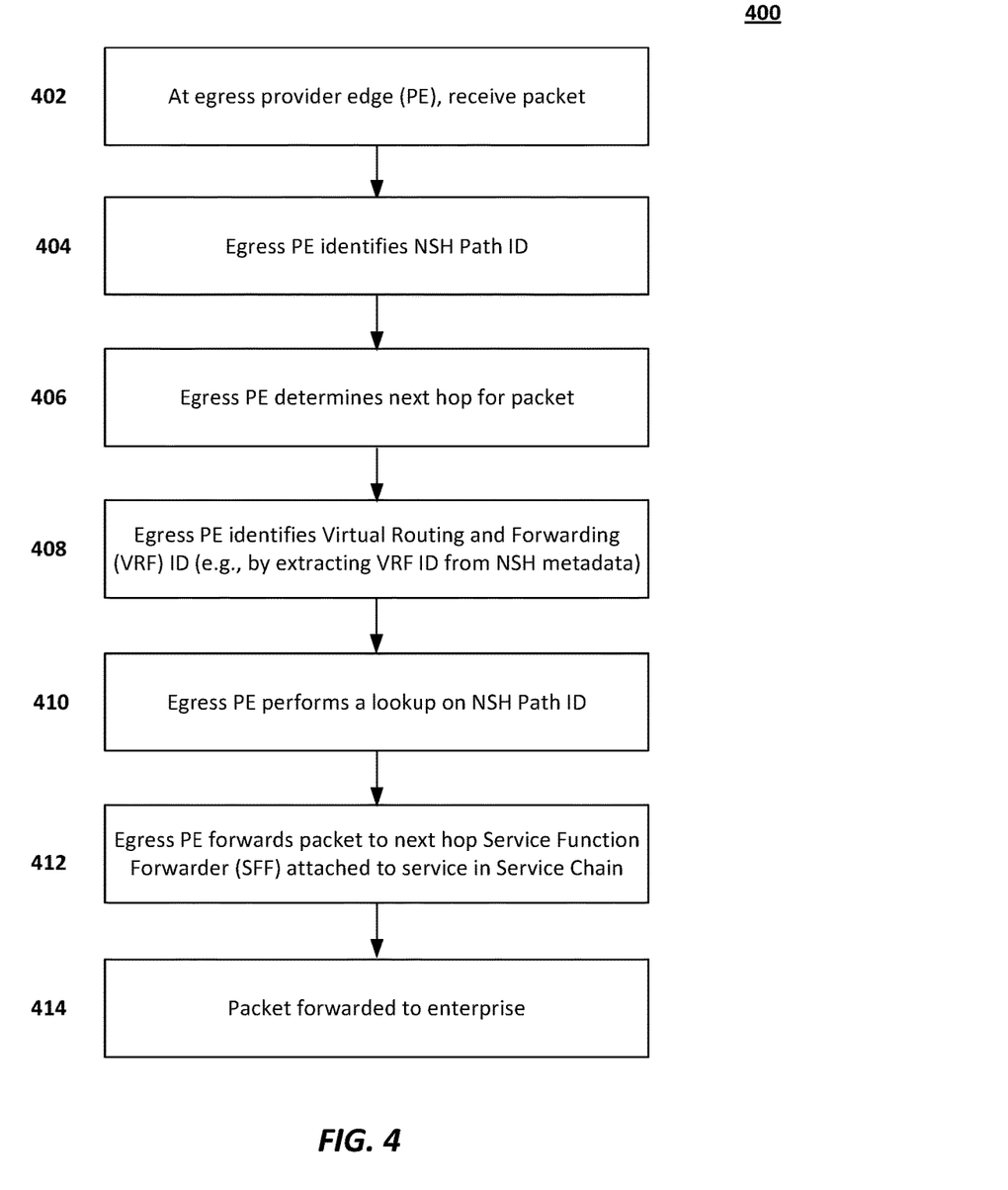
FIG. 4 is a process flow diagram for identifying forwarding information in accordance with embodiments of the present disclosure.

Turning to FIG. 4, FIG. 4 is a process flow diagram for identifying forwarding information in accordance with embodiments of the present disclosure. The egress PE (e.g., PE2 20B) can receive the packet (402). The egress PE can receive the packet, for example, from the exit point of the S2 45B service (such as the SFF2 40B). The egress PE can identify the network service header path ID (404). The egress PE can identify the next hop for the packet (406). For example, the egress PE can determine that for NSH path-id 101, the egress PE should extract the VRF-ID from the NSH metadata to determine in which VPN context the next-hop resolution should occur (408). In some embodiments, the egress PE can be programmed to associate the NSH path-id with the VPN-name (here, path-id 101 associated with VPN-Alpha 2) then the extraction of metadata is not necessary.

The egress PE performs a lookup on <NSH path-id 101, SI> and forwards the packet to the next-hop SFF attached to the destination service (e.g., S3 45C) (412).

Post S3 the service chain is terminated and because the packet is within VPN context and within the correct VPN site the packet can be routed normally as the reachability of 201.10.1.1/32 is guaranteed (414).

It will therefore be appreciated that the embodiments described herein may provide full integration of NSH service chaining with L3VPNs. Further, routing and services may be decoupled so that services are not tied to topology and routing does not need to be bent following a services topology. Moreover, routing does not need to incorporate a particular topology (such as hub and spoke and/or inline service insertion) to be able to forward site-to-site VPN traffic through a set of services. Also, the dependency on orchestration to maintain L3VPN forwarding context may be removed. As a result of disassociating routing from service insertion and removing dependency on orchestration for VPN context, L3VPN providers may provide services to L3VPN customers with agility, simplicity, and minimized operational costs.

The methods and system described herein allow for creating a service topology "inside" the L3VPN topology (both edge-to-edge). Within that service topology, services can be applied by way of an service chain (either NSH-based, or otherwise), and other features (i.e., other transformations and value-add functions applied on L3VPNs, such as known in the art, in addition to a service chain). Furthermore, these methods are not limited to service chaining. Packets could enter an MPLS network with a VPN ID, go into a Virtual Extensible Local Area Network (VxLAN), go back into the MPLS network, and as along as the proper context header is present, the VPN ID would remain unchanged and consistent without any re-classification.

Further still, these techniques need not be limited to L3VPN. It will be appreciated by one of ordinary skill in the art that any forwarding context such as L2, VXLAN virtual network identifier (VNID), etc. can follow the same pattern. For example, perhaps traffic comes in L2VPN, but it needs to exit the topology with VxLAN. Exit VXLAN information is pushed, then NSH. After the NSH topology, the correct VxLAN is present.

It is appreciated that software components of the present invention may, if desired, be implemented in ROM (read only memory) form. For example, in some embodiments, the operations to be performed at an edge device (e.g., PE 20A, PE 20B and/or vPenPE 50) may be in the form of software that is processed by a processor. The software components may, generally, be implemented in hardware, if desired, using conventional techniques. For example, in some other embodiments, the operations to be performed at an edge device (e.g., PE 20A, PE 20B and/or vPenPE 50) may be in the form of firmware that is processed by Application Specific Integrated Circuits (ASICs), which may be integrated into a circuit board. Alternatively, the operations may be implemented in the form of one or more logic blocks included in a programmable logic device (e.g., a field-programmable gate array). It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. A method for applying network services to data traffic forwarded between virtual private network (VPN) sites, the method comprising:
  on a forwarding edge router of a transport network in communication with an origin site associated with a VPN, receiving a data packet addressed to a target site associated with the VPN;
  determining a set of services to be applied to the data packet via a service chain, wherein the determining is a function of at least the VPN, wherein the set of services are applied in response to a Network Service Header (NSH) encapsulation of the data packet, and wherein a first of the set of services is applied within the transport network and a second of the set of services is applied outside the transport network;
  augmenting metadata of the NSH encapsulation of the data packet with a virtual routing and forwarding identifier (VRF-ID) of a VRF instance associated with the VPN to configure the packet for forwarding to the second of the set of services from an egress edge router of the transport network, wherein the VRF-ID identifies a VRF-name and a VRF table indicating one or more services to be applied to the data packet;
  encapsulating the data packet with the NSH encapsulation to form an encapsulated data packet; and
  forwarding the encapsulated data packet into the transport network in accordance with the service chain.

2. The method of claim 1, further comprising forgoing augmentation of a VPN label into multiprotocol label switched (MPLS) metadata of the data packet.

3. The method according to claim 1, wherein the VPN sites are Level 3 VPN (L3VPN) sites.

4. The method according to claim 1, wherein determining the set of services comprises looking up the set of services to be applied in a VRF table according to at least one of the VPN, the origin site or the target site.

5. The method according to claim 1, wherein the service chain is used to apply the set of services to the data traffic addressed to more than one target site.

6. An apparatus comprising:
an edge router of a transport network comprising a hardware processor, the hardware processor configured to:
receive a data packet addressed to a target site associated with a virtual private network (VPN);
determine a set of services to be applied to the data packet via a service chain, wherein the determining is as a function of at least the VPN, wherein the set of services are applied in response to Network Service Header (NSH) encapsulation of the data packet, and wherein a first of the set of services is applied within the transport network and a second of the set of services is applied outside the transport network;
augment metadata of the NSH encapsulation of the data packet with a virtual routing and forwarding identifier (VRF-ID) of a VRF instance associated with the VPN to configure the packet for forwarding to the second of the set of services from an egress edge router of the transport network, wherein the VRF-ID identifies a VRF-name and a VRF table indicating one or more services to be applied to the data packet;
encapsulate the data packet with the NSH encapsulation to form an encapsulated data packet; and
forward the encapsulated data packet into the transport network in accordance with the service chain.

7. The apparatus of claim 6, wherein the edge router is a provider edge router.

8. The apparatus of claim 6, wherein the VPN is a Level 3 VPN.

9. The apparatus of claim 6, wherein the edge router is configured to attach an MPLS label to the data packet, and the edge router is further configured to forgo augmentation of a VPN label into MPLS metadata of the data packet.

10. The apparatus of claim 6, wherein the service chain is used to apply the set of services to the data traffic addressed to more than one target site.

11. A method for applying network services to data traffic forwarded between virtual private network (VPN) sites, the method comprising:
on an egress edge router of a transport network in communication with an origin site associated with a VPN, receiving a data packet addressed to a target site associated with the VPN, and to which a first service was applied to the packet via a service chain within the transport network;
determining a second service to be applied to the data packet via the service chain outside the transport network in response to Network Service Header (NSH) encapsulation of the data packet and based at least in part on a virtual routing and forwarding identifier (VRF-ID) of a VRF instance associated with the VPN contained in a metadata field of the NSH, wherein the determining is a function of at least one of the VPN, the origin site or the target site, and wherein the VRF-ID identifies a VRF-name and a VRF table indicating one or more services to be applied to the data packet; and
routing the data packet to a service function forwarder associated with the determined second service arranged outside of the transport network.

12. The method of claim 11, wherein the egress edge router is in communication with the target site.

13. The method of claim 11, wherein the egress edge router is positioned between the origin site and the target site.

14. The method of claim 11, further comprising routing the data packet from the service function forwarder to at least one VPN site based on a destination address.

15. The method of claim 11, wherein the VPN is a Level 3 VPN.

16. The method of claim 11, wherein the service chain is used to apply services to data traffic addressed to more than one target site.

17. An apparatus comprising:
an egress edge router of a transport network in communication with an origin site associated with a virtual private network (VPN), comprising a hardware processor, the hardware processor configured to:
receive a data packet addressed to a target site associated with the VPN, wherein a first service was applied to the packet via a service chain within the transport network;
determine a second service to be applied to the data packet via the service chain according to Network Service Header (NSH) encapsulation of the data packet and based at least in part on a virtual routing and forwarding identifier (VRF-ID) of a VRF instance associated with the VPN contained in a metadata field of the NSH, wherein the determining is a function of at least one of the VPN, the origin site or the target site, and wherein the VRF-ID identifies a VRF-name and a VRF table indicating one or more services to be applied to the data packet; and
route the data packet to a service function forwarder associated with the determined second service arranged outside of the transport network.

18. The apparatus of claim 17, wherein the egress edge router is positioned between the origin site and the target site.

19. The apparatus of claim 17, wherein the egress edge router is logically positioned between the origin site and the target site.

20. The apparatus of claim 17, wherein the egress edge router is further configured to route the data packet from the service function forwarder to at least one VPN site based on a destination address.

21. The apparatus of claim 17, wherein the VPN is a Level 3 VPN.

22. The apparatus of claim 17, wherein the service chain is used to apply services to data traffic addressed to more than one target site.

* * * * *